United States Patent [19]
Domenico

[11] 3,891,659
[45] June 24, 1975

[54] HALOPYRIDYL THIOALKYLTHIOCYANATES

[75] Inventor: Penelope B. Domenico, Fairfax, Va.

[73] Assignee: The Dow Chemical Company, Midland, Mich.

[22] Filed: Apr. 15, 1974

[21] Appl. No.: 460,835

[52] U.S. Cl..... 260/294.8 F; 260/294.8 G; 424/263
[51] Int. Cl..................... C07d 31/48; C07d 31/50
[58] Field of Search ............... 260/294.8 G, 294.8 F

[56] References Cited
UNITED STATES PATENTS

| | | | |
|---|---|---|---|
| 3,758,482 | 9/1973 | Domenico | 260/294.8 G |
| 3,787,422 | 1/1974 | Domenico | 260/294.8 F |
| 3,787,425 | 1/1974 | Domenico | 260/294.8 G |

OTHER PUBLICATIONS

Friedrich et al., Chem. Abstracts, Vol. 63, (6), 6971–f to 6972–f (Sept. 1965).

*Primary Examiner*—Alan L. Rotman
*Attorney, Agent, or Firm*—S. Preston Jones

[57] ABSTRACT

Compounds corresponding to the formula

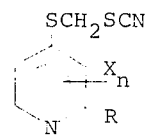

wherein X represents chloro or bromo; n represents an integer of from 2 to 3 and R represents trichloromethyl, trifluoromethyl or methylsulfonyl. These compounds have been found to be useful as bactericides or fungicides.

6 Claims, No Drawings

HALOPYRIDYL THIOALKYLTHIOCYANATES

PRIOR ART

Various pyridyl thioalkylthiocyanates are known and are taught in Belgian Pat. No. 722,018. Other related compounds are taught in Chemical Abstracts, Vol. 63, (1965) 6971f through 6972f, especially 6972b; and U.S. Pat. No. 3,758,482.

SUMMARY OF THE INVENTION

The present invention is directed to halopyridyl thioalkylthiocyanates corresponding to the formula

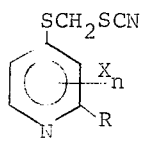

wherein X represents chloro or bromo; n represents an integer of from 2 or 3 and R represents trichloromethyl, trifluoromethyl or methylsulfonyl.

For convenience, the compounds embraced by the generic formula will be hereinafter identified as halopyridyl thioalkylthiocyanates.

The halopyridyl thioalkylthiocyanates of the present invention are crystalline solids or oils which are of low solubility in water and of moderate solubility in common organic solvents. These compounds have low phytotoxicity and are suitable for use as bactericides and fungicides.

The compounds of the present invention can be prepared by the reaction of an appropriate halo-substitute 2-(trichloromethyl), (trifluoromethyl) or (methylsulfonyl)-4-(alkali metal mercapto)pyridine with a chloromethylcyanate in a solvent. This reaction can be represented as follows:

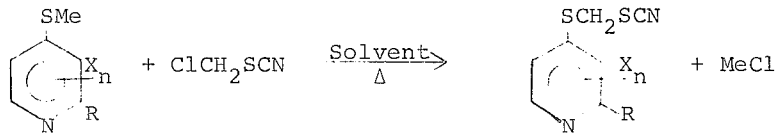

wherein X, n and R are as hereinabove defined and Me represents sodium, lithium, potassium, cesium or rubidium.

In carrying out this reaction, the reactants are contacted together in the presence of an inert solvent or reaction medium such as, for example, dimethylsulfoxide, hexamethylphosphoramide, or 4-formylmorpholine. The reaction can be carried out at temperature of from about 40° up to reflux, dependent upon the solvent employed. The reaction consumes the reactants in equimolar amounts and the use of these amounts is preferred.

The reactants are maintained together until the reaction is complete, usually from about 15 minutes to about 4 hours. Upon completion of the reaction, the reaction mixture is poured into cold water and filtered to remove the alkali metal chloride by-product, formed during the reaction. The mixture is further treated with additional solvent to take up the desired compound. After solvent removal, the crude product is recovered as a residue. If desired, the product can be further purified by recrystallization from a solvent such as benzene, hexane or mixtures thereof.

In an alternative procedure, the alkali metal mercapto pyridine reactant can be prepared in situ by the reaction of a halopyridylthiol, of the formula

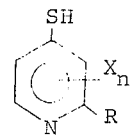

wherein X, n and R are as hereinbefore defined, with an alkali metal in a solvent. This in situ preparation is usually carried out by first dissolving the alkali metal in an alkanol and admixing this, at room temperature, with a solution of the halopyridinethiol in one of the solvents hereinbefore set forth. The chloromethylthiocyanate can thereafter be added directly to the alcoholic solution of the halo alkali metal thiopyridine and this mixture refluxed until the completion of the reaction, usually from about 30 minutes to about 2 hours. After the completion of the reaction, the reaction mixture is filtered to remove the alkali metal chloride by-product. The alcohol is thereafter removed by evaporation under reduced pressure. The purified product can be recovered from the residue by crystallization from one of the above named solvents.

DESCRIPTION OF SOME PREFERRED EMBODIMENTS

The following examples illustrate the present invention and the manner by which it can be practiced, but, as such, should not be construed as limitations upon the overall scope of the same.

EXAMPLE I 3,5-Dichloro-2-(trifluoromethyl)-4-[(thiomethyl)-thiocyanato]pyridine

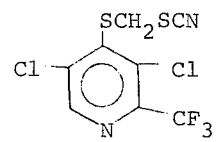

To a stirring solution of 5.0 grams (0.02 mole) of 3,5-dichloro-2-(trifluoromethyl)-4-pyridylthiol in 25 milliliters of 28 percent absolute ethanol was added a solution containing 0.5 grams of sodium metal dissolved in 25 milliliters of 28 percent absolute ethanol. The mixture was thereafter refluxed for 0.5 hour and 2.47 grams (0.023 mole) of chloromethylthiocyanate was added thereto. This mixture was refluxed for 0.5 hour. At the completion of the reaction, the reaction mixture was filtered to remove sodium chloride formed as a by-product. The ethanol was removed under reduced pressure and the residue treated with a benzene-hexane mixture. The solid 3,5-dichloro-2-(trifluoromethyl)-4-[(thiomethyl)thiocyanato]pyridine product was recovered by filtration after cooling the solvent solution. The product was recovered in a yield of 6.21 grams (70.0 percent of theoretical) and melted at 45°C. Upon analysis the product was found to have carbon, hydrogen, chlorine, nitrogen and sulfur contents of 30.4, 1.4, 21.9, 9.0 and 20.2 percent, respectively, as compared with the theoretical contents of 30.1, 0.9, 22.2, 8.8 and 20.1 percent, respectively, calculated for the above named structure.

EXAMPLE II 3,5,6-Trichloro-2-(methylsulfonyl)-4-[(thiomethyl)-thiocyanato]pyridine

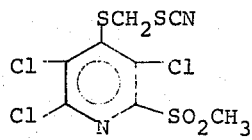

To a solution of 13.6 grams (0.0465 mole) of 3,5,6-trichloro-2-(methylsulfonyl)-4-pyridylthiol 1 or 50 milliliters of dimethylsulfoxide was added a solution of 1.07 grams (0.0465 mole) of sodium metal in 35 milliliters of methanol. To this mixture was added 5.0 grams (0.0465 mole) of chloromethylthiocyanate. The mixture was heated, with stirring, at 40°-44° for ~ 2 and 1/2 hours and thereafter poured into 250 milliliters of cold water and filtered. After a reslurrying in fresh water and an additional filtration step, the recovered crude residue was dried. The solid was taken up in methylene chloride, filtered and the methylene chloride evaporated off. The 3,5,6-trichloro-2-(methylsulfonyl)-4-[(thiomethyl)thiocyanato]pyridine product was recovered after recrystallization from a 40/60 benzene-hexane mixture in a yield of 4.2 grams (24.9 percent of theoretical melted at 89°–92°C. Upon analysis, the product was found to have carbon, hydrogen, chlorine, nitrogen and sulfur contents of 26.6, 1.6, 29.4, 7.5 and 26.6 percent, respectively, as compared with the theoretical contents of 26.4, 1.4, 29.3, 7.7 and 26.5 percent, respectively, calculated for the above named compound.

The following compounds of the present invention are prepared in accordance with the methods hereinbefore set forth.

3,6-Dibromo-2-(methylsulfonyl)-4-[(thiomethyl)-thiocyanato]pyridine having a molecular weight of 418.13;

3,5-Dichloro-2-(methylsulfonyl)-4-[(thiomethyl)-thiocyanato]pyridine having a molecular weight of 329.21;

3,5,6-Tribromo-2-(trichloromethyl)-4-[(thiomethyl)thiocyanato]pyridine having a molecular weight of 429.98;

3,6-Dichloro-2-(trichloromethyl)-4-[(thiomethyl)-thiocyanato]pyridine having a molecular weight of 358.52; and 3,5,6-Tribromo-2-(methylsulfonyl)-4-[(thiomethyl)-thiocyanato]pyridine having a molecular weight of 497.05.

In accordance with the present invention, it has been discovered that the halopyridylthioalkylthiocyanates can be employed for the control of many bacterial and fungal organisms. In still further operations, the compounds of the present invention or compositions containing them as toxic constituents can be included in and on plaster, ink, wallboard, textiles, paper, adhesives, soaps, synthetic detergents, cutting oils, polymeric materials, embalming fluids, oil paints and latex paints to prevent the attack of various fungal pests and the subsequent economic loss due to the degradation of such products by micro-organisms. Also, the compounds can be distributed in textiles or cellulosic materials to preserve and protect such products from the attack of the organisms of rot, mold and decay.

The exact concentration of the toxicant to be employed in the treating compositions is not critical and may vary considerably provided the required dosage of the effective agent is supplied in the ink, adhesive, soap, cutting oil, polymeric material, paint, textile, paper, or growth medium. The concentration of toxicant in liquid compositions generally is from about 0.0001 to 50 percent by weight. Concentrations up to 95 percent by weight are oftentimes conveniently employed, particularly in concentrate compositions. In dusts, the concentrations of the toxicant can be from about 0.1 to 95 percent by weight. In compositions to be employed as concentrates, the toxicants can be present in a concentration of from 5 to 98 percent by weight. For use as a spray, it is often convenient to prepare the compounds as wettable powders.

In a representative operation, 3,5,6-trichloro-2-(methylsulfonyl)-4-[(thiomethyl)thiocyanato]pyridine when employed as the sole toxicant in a nutrient agar at a concentration of 10 parts by weight of the compound per million parts of agar was found to give 100 percent kill and control of the organism Staphylococcus aureus, Mycobacterium phlei, Bacillus subtilis, Trichophyton mentagrophytes, Pullularia pullulans, Ceratocystis ips, Trichoderm sp Madison P-42, Rhizopus nigricans and Aspergillus nigricans.

In and additional operation, when employed at a concentration of 100 parts by weight of a nutrient agar, this same compound was found to give 100 percent kill and control of the organisms Candida albicans, Pseudomonas Sp Strain 10, Salmonella typhosa and Candida pelliculosa.

In other representations, 3,5-dichloro-2-(trifluoromethyl)-4-[(thiomethyl)thiocyanato]pyridine was found to give 100 percent kill and control of the organisms Staphylococcus aureus, Candida albicans, Tricophyton mentagrophytes, Bacillus subtilis, Aspergillus terreus, Candida pelliculosa, Pullularia pullulans, Mycobacterium phlei, Ceratocystis ips, Cephaloascus fragans, Trichoderma sp. Madison P-42, and Rhizopus nigricans, when employed as the sole toxicant in a nutrient agar at a concentration of about 10 parts by weight of the compound per million parts of agar.

What is claimed is:

1. A compound corresponding to the formula

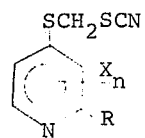

wherein X represents chloro or bromo; n represents an integer of from 2 or 3 and R represents trichloromethyl, trifluoromethyl or methylsulfonyl.

2. The compound of claim 1 corresponding to the formula

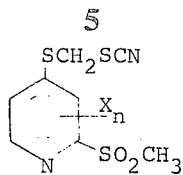
3. The compound of claim 1 which is 3,5,6-trichloro-2-(methylsulfonyl)-4-[(thiomethyl)thiocyanato]-pyridine.
4. The compound of claim 1 corresponding to the formula
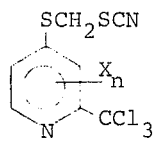
5. The compound of claim 1 corresponding to the formula
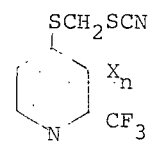
6. The compound of claim 1 which is 3,5-dichloro-2-(trifluoromethyl)-4-[(thiomethyl)thiocyanato]pyridine.
* * * * *